Patented May 30, 1933

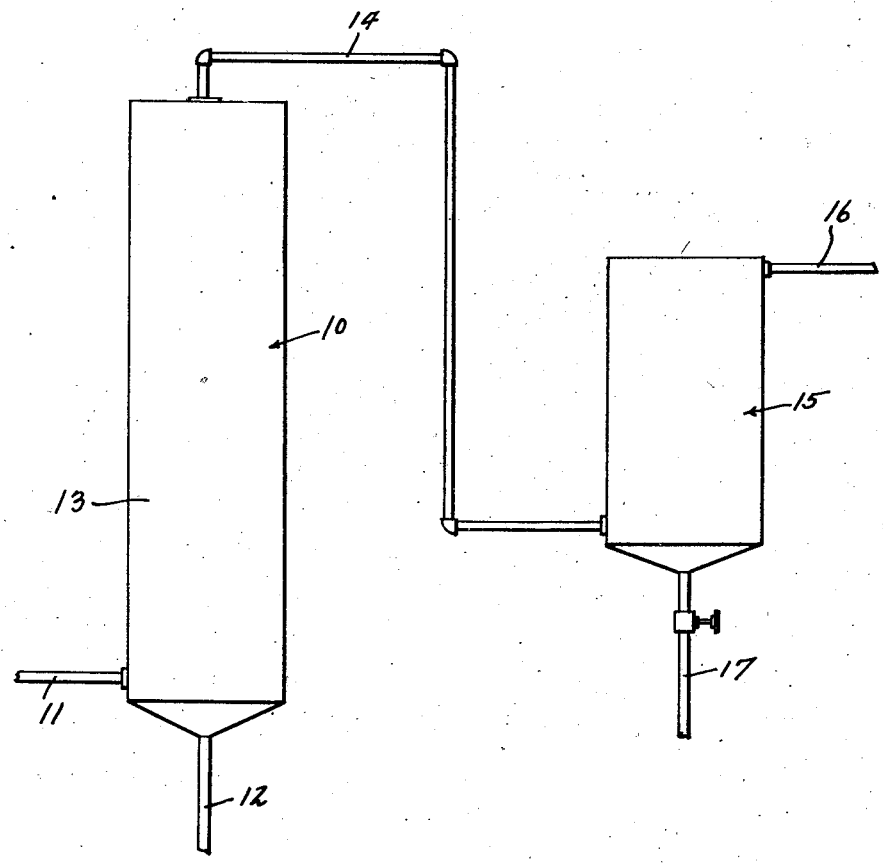

1,911,419

UNITED STATES PATENT OFFICE

ALBERT N. BELCHER AND DONALD B. NUTT, OF EL SEGUNDO, CALIFORNIA, ASSIGNORS TO STANDARD OIL COMPANY OF CALIFORNIA, OF SAN FRANCISCO, CALIFORNIA, A CORPORATION OF DELAWARE

PROCESS OF TREATING OILS REFINED WITH RECOVERED ACID

Application filed June 13, 1932. Serial No. 616,799.

This invention relates to a method of treating petroleum oils for the removal of finely divided and suspended carbonaceous particles therefrom. In the treatment of petroleum oils and distillates, such oils and distillates are often brought into contact with refining agents such as sulfuric acid. In many instances, the acid employed is relatively impure, such acid being a recovered reagent from prior applications to oil. Such recovered acid, often termed "black acid", contains a certain proportion of carbonaceous matter.

When a petroleum oil is treated with sulfuric acid, acid reaction products are produced which collectively are referred to by the industry as "sludge." If the acid used was recovered or black acid, the treated oil contains, in addition to the tarry and polymerized products of reaction, a quantity of finely divided carbon or carbonaceous matter, derived (perhaps in modified form) from the black acid.

Various processes have been devised heretofore for the removal of sludge from acid treated oils. For example, a prior application, Serial No. 299,282, filed by James H. Osmer and Frederick L. Craise, discloses a process whereby sludge may be continuously removed from acid treated oils. In such process, the acid treated and sludge-containing oil is passed upwardly through a graded bed of particles which are capable of being selectively wetted by the sludge. The sludge coagulates on the surfaces of the particles and drains downwardly, whereas the sludge-free oil is discharged from the top of the treater.

The process described in the aforesaid application is an efficient and economical method of removing suspended sludge from acid treated oils. Other methods such as settling, centrifuging, filtering, etc., offer alternative methods of removing sludge. However, in the case of oils which have been treated with recovered acid, mere desludging is not sufficient. Even after the sludge is removed, such oils contain extremely finely divided carbonaceous matter in suspension, as previously stated. The removal of such matter presents an additional, and much more difficult problem. The present invention has to do with a means of solving such problem.

The carbonaceous matter found in petroleum oils which have been refined by treatment with uncleaned recovered or black acid, can be distinguished from the sludge in that although the sludge is of a high acid character, the carbonaceous matter is not nearly as high in acid content. Sludge particles, even extremely fine sludge particles, are visible to the eye when a portion of the substantially desludged oil is examined in a sample bottle. In making the test, the sample of oil is allowed to stand quietly for a short period, say, 5 minutes, when the sludge particles, if any are present, will settle on the sides or bottom of the bottle. The carbonaceous matter generally will remain in suspension, and when the bottle is held to the light the suspended material becomes visible in the form of minute specks. These specks are the carbonaceous matter which characterize oils treated with recovered acid. Such carbonaceous matter is high in carbon and may, as a matter of fact, contain free carbon. Furthermore, although the minute particles of carbonaceous matter exhibit characteristics of solid particles to a much greater degree than finely divided particles of sludge, they may more correctly be said to be particles which are very viscous or semisolid.

The removal of this carbonaceous matter is of considerable importance. The carbonaceous particles are apparently coated with a very thin film or sludge or hydrocarbons and when such carbon-containing oil is scrubbed with water or an alkaline solution, a decided reversal in color is obtained, that is, the color of the oil or distillate is impaired.

The present invention is, therefore, primarily directed to the treatment of oils containing finely divided carbonaceous matter of the character obtained by treatment of oils with recovered acid. It has been discovered that such carbon-containing oils may be readily treated by first separating and removing the major portion of the sludge from the oil in any desired manner as, for example, by means of the process disclosed in the aforesaid application, Serial No. 299,282, and then passing the sludge-free but carbon-bearing oil through a bed of solid material, said bed being composed of particles of a size adapted to produce voids of a predetermined or desired size. The particles of carbonaceous material in suspension in the oil appear to attach themselves to the particles of rock or other material constituting the bed and very large quantities of oil may thus be treated continuously by a single porous bed without clogging or impairing the effectiveness of such bed.

After a large quantity of oil containing carbonaceous matter has been passed through a bed of this sort and when apparently the surfaces of the particles constituting the bed have become coated with a film of these carbonaceous particles, the films exhibit flow and drain downwardly through such bed, thereby permitting a continuous operation for indefinite periods of time during which the carbonaceous matter may be continuously removed from the bottom of the bed.

An object of this invention is therefore, the provision of a method of treating oils containing finely divided carbon and/or carbonaceous particles in suspension for the removal of such particles from the oil.

Another object is to disclose and provide a method of treating oils containing semi-viscous carbonaceous particles resulting from contact of the oil with a recovered or black acid.

A further object of the invention is to disclose and provide a method of treating petroleum oils and distillates bearing finely divided carbonaceous matter in suspension, whereby such carbonaceous and viscous matter may be removed in a continuous manner and the subsequent refining of the oil facilitated.

In describing the invention, reference will be had to the appended drawing which diagrammatically illustrates a form of apparatus in which the invention may be placed in operation. As there shown, a tower 10 provided with an inlet for acid-treated and sludge-containing oil 11 near its bottom and a sludge outlet 12 leading from the bottom, is filled with a graded bed of solid insoluble material generally indicated at 13. The sludge-containing oil rises upwardly through the bed of material 13, the sludge particles coalescing on the surfaces of the bed and draining downwardly towards the outlet 12. Substantially sludge-free oil is discharged from the top of the treater 10 as by means of the line 14. In normal operation, that is, when the oil has been treated with clean or fresh acid, the oil discharged by line 14 would be of a character capable of being washed without reversal of color. If, however, the oil admitted into the treater 10 had been treated with black or recovered sulfuric acid, then although the oil discharged by line 14 is apparently clean to the eye, it contains extremely minute particles of carbonaceous matter of the character described hereinabove. In accordance with this invention, these finely divided carbonaceous particles are removed by passing the oil by line 14 into a secondary treating unit 15, said secondary treating unit containing a bed of insoluble material to which the carbonaceous particles may attach themselves. Such a bed may be made from rock, gravel, earthenware or porcelanic bodies or any other similar insoluble material.

The packing material in the unit 15 should be composed of relatively small particles, thereby providing restricted voids through which the oil may pass. It has been found, for example, that rock normally termed No. 3 rock and composed of particles from about $\frac{1}{4}$ to $\frac{3}{4}$ inches in diameter, forms a satisfactory packing. No. 4 rock, which will pass through a $\frac{1}{2}$ inch mesh but of which 45% to 50% will pass through a $\frac{1}{4}$ inch mesh and only about 2% or 3% through a 10 mesh sieve, can also be employed. Any material appreciably finer than No. 4 rock is not as satisfactory in that the voids become too minute and the capacity of the treating unit is materially reduced. Furthermore, a finer packing material requires the application of considerable pressure to the oil to force the oil through the bed. A material smaller than blast sand, for example, is not satisfactory. The essential requirements which limit the possible size of packing material are, therefore, the allowable pressure drop which can be accommodated, and the necessity of avoiding a bed which will clog. A very finely porous bed which can be clogged by the accumulation of carbonaceous material requires frequent cleaning and therefore is not adapted to continuous treatment of oils of the character described herein.

Furthermore, the packing material is preferably so classified in size of particles as to produce a bed containing from about 40% to 65% voids. Moreover, the voids of such bed preferably have an average cross-sectional area ranging from about 0.003 to about 0.06 square inches. A bed provided with voids of this type will permit the carbonaceous material to adhere to the surfaces of the particles constituting the bed and upon the accumulation of a sufficient quantity of carbonaceous material on such surfaces, the material will flow downwardly and drain from such surfaces without clogging the voids of such bed.

For this reason, the substantially sludge-free oil admitted by line 14 into the treater 15 will pass upwardly through the voids of the bed in such treater and be discharged through line 16 as a clean oil free from carbonaceous material, such oil being capable of being water-washed or treated with alkali solutions without reversal in color. The accumulations of carbonaceous matter may be continuously or periodically withdrawn as through the valved outlet 17 in the bottom of the treater 15.

It will be thus evident that a specific problem has been solved, namely, the prevention of color reversal of sludge-free oils when such oils had been refined by means of recovered or black acid. It is to be understood that the process of this invention is not limited to the specific form of apparatus described hereinabove as numerous changes and modifications could be made without departing from the spirit of the invention.

All such changes and modifications as come within the scope of the appended claims are embraced thereby.

We claim:

1. A process of treating petroleum oils which have been refined with recovered sulfuric acid, said oils containing a sludge and finely divided carbonaceous particles, to produce clean oils which will not revert in color upon subsequent washing with aqueous media, which comprises: separating sludge from the oil to produce a substantially sludge-free oil containing finely divided carbonaceous matter suspended therein; forming a bed of finely divided solid insoluble material; and passing the substantially sludge-free oil through voids in said bed, whereby the carbonaceous matter is collected in said bed and clean oil free from carbonaceous matter is discharged from the bed.

2. A process of treating petroleum oils which have been refined with recovered sulfuric acid, said oils containing a sludge and finely divided carbonaceous particles, to produce clean oils which will not revert in color upon subsequent washing with aqueous media, which comprises: separating sludge from the oil to produce a substantially sludge-free oil containing finely divided carbonaceous matter suspended therein; forming a bed of finely divided solid insoluble material provided with voids having an average cross-sectional area of between about 0.003 and 0.06 square inches; and passing the substantially sludge-free oil through voids in said bed whereby the carbonaceous matter is collected in said bed and clean oil free from carbonaceous matter is discharged from the bed.

3. A continuous process of treating petroleum oils which have been refined with recovered sulfuric acid, said oils containing a sludge and finely divided carbonaceous particles, to produce clean oils which will not revert in color upon subsequent washing with aqueous media, which comprises: separating sludge-free oil to produce a substantially sludge-free oil containing finely divided carbonaceous matter suspended therein; forming a bed of finely divided solid insoluble material and continuously passing the substantially sludge-free oil through voids in said bed whereby said carbonaceous matter is collected in said bed; continuously discharging clean oil from said bed and permitting the collected carbonaceous matter to drain downwardly through said bed; and separately withdrawing the collected carbonaceous matter from said bed.

Signed at El Segundo, California, this 6th day of May, 1932.

ALBERT N. BELCHER.
DONALD B. NUTT.